Figure 1:
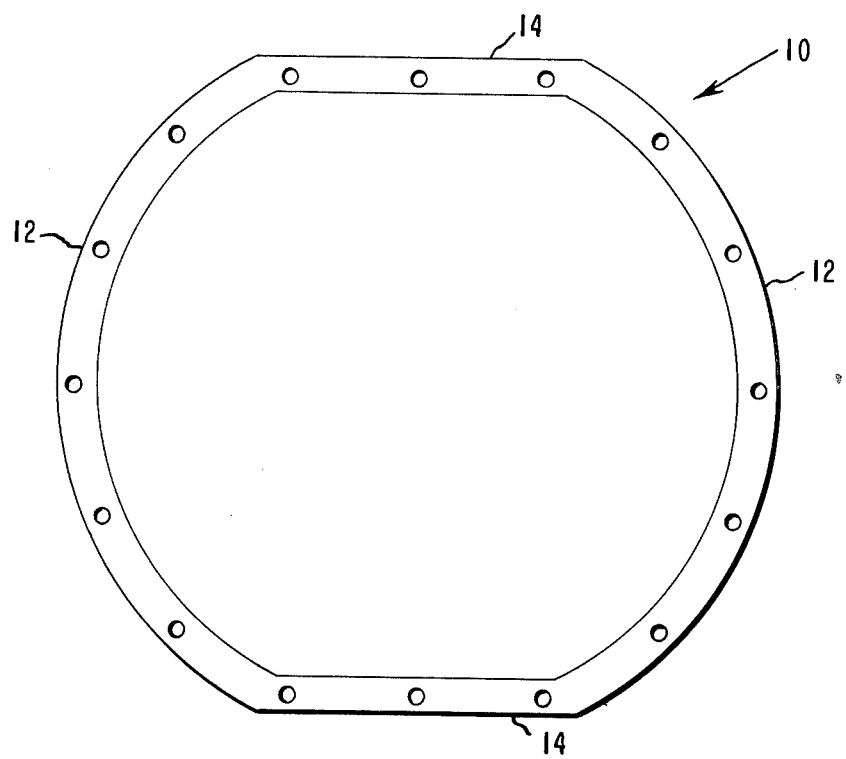

United States Patent [19]

Livingston et al.

[11] 4,028,443

[45] June 7, 1977

[54] DISTILLATION APPARATUS

[75] Inventors: Richard Donnan Livingston; Robert Dewey Sauerbrunn, both of Seaford, Del.

[73] Assignee: E. I. Du Pont de Nemours and Company, Wilmington, Del.

[22] Filed: Sept. 24, 1976

[21] Appl. No.: 726,290

[52] U.S. Cl. .......................... 261/114 TC; 202/158
[51] Int. Cl.² ...................... B01D 3/14; B01F 3/04
[58] Field of Search .................... 202/158, DIG. 22; 261/114 TC, 114 R, 113 R, 94, 97; 52/19–21

[56] References Cited

UNITED STATES PATENTS

| | | |
|---|---|---|
| 2,582,688 | 1/1952 | Ford ............................. 261/114 R |
| 2,889,018 | 6/1959 | Swan ............................. 261/114 R |
| 2,963,872 | 12/1960 | Latimer ......................... 261/114 R |
| 3,364,124 | 1/1968 | Walker et al. ...................... 202/158 |
| 3,729,179 | 4/1973 | Keller ............................. 261/114 R |

*Primary Examiner*—Wilbur L. Bascomb, Jr.

[57] ABSTRACT

A novel one-piece tray and matching supporting ring simplify the assembly of distillation columns having multiple plates. The trays and the openings in their supporting rings, which are attached to the inner wall of the column, are in the shape of a circle interrupted by two parallel chords, the tray width between the tray chords being smaller than the circular diameter of the ring opening.

3 Claims, 6 Drawing Figures

DISTILLATION APPARATUS

This invention concerns a distillation column having multiple plates with trays shaped to facilitate column assembly.

Distillation columns are widely used in the chemical processing industry for the fractionation and separation of liquid mixture. Typical uses include the refining of oil, recovery of solvents from industrial operations, and the separation of volatile organic compounds from steam. Most of these columns use multiple plates to increase fractionation efficiency. The bubble cap fractionating column has been a particular favorite.

The column may be constructed of several segments, called spool pieces, stacked atop each other and bolted together to reach the desired height. Each spool piece may contain one or more plates. A plate consists of a tray and its support. The trays are peripherally supported and spacing maintained inside the column by supporting rings on the interior of the spool pieces. When more than two plates are fitted within a single column or spool piece, assembly thereof becomes difficult because a whole tray cannot be passed through the support rings from one tray position to another. The usual assembly technique requires making the tray in two halves, inserting the halves separately, and assembling the tray inside the spool piece. The assembled tray must be leakproof to maintain a liquid pool on its surface. Therefore the joints, where the tray pieces mate to form a complete tray, require backup plates, gaskets, and closely-spaced bolting. This assembly is cumbersome and expensive. The use of assembled trays can be avoided by using only two plates per spool piece, but this results in an economic penalty because the connecting flanges of each spool piece must be carefully machined to be smooth and flat, properly gasketed, and bolted for a liquid and vapor proof seal. The most economical column assembly would have relatively long spool pieces with several plates each, if it were not for the problem of assembling trays inside the long spool pieces.

This invention is in a distillation column containing more than two distillation plates, each plate being comprised of a circular tray peripherally supported by a ring attached to the inner cylindrical wall of the column, and the supporting ring having an opening, the improvement comprising said tray periphery and said opening both having the shape of a circle interrupted by two parallel chords, and the tray width between the tray chords being smaller than the circular diameter of the support ring opening.

Preferably for simplicity the tray chords equal each other in length and the ring opening chords are equal. To peripherally support the tray, the circular diameter of the ring opening must be smaller than the circular diameter of the tray and the opening width between chords must be smaller than the tray width between chords. When assembled, the tray chords are preferably oriented substantially parallel to the ring opening chords.

FIG. 1 shows a top view of tray 10 having a periphery consisting of circular portions 12 interrupted by parallel chords 14. The tray contains the necessary openings and fittings (not shown) for assembly and use in a distillation column.

Figure 2:
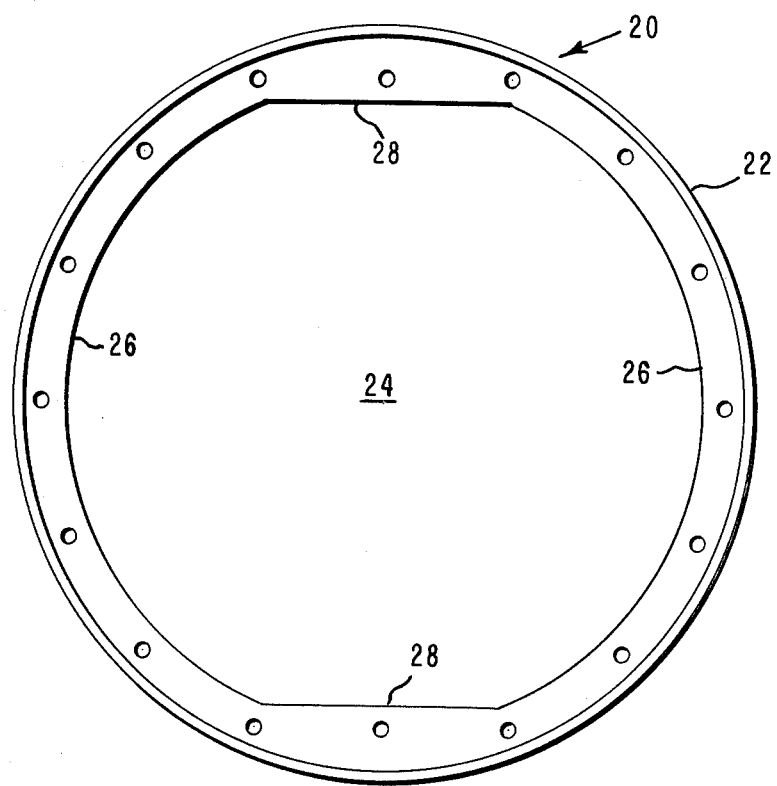
Figure 3:
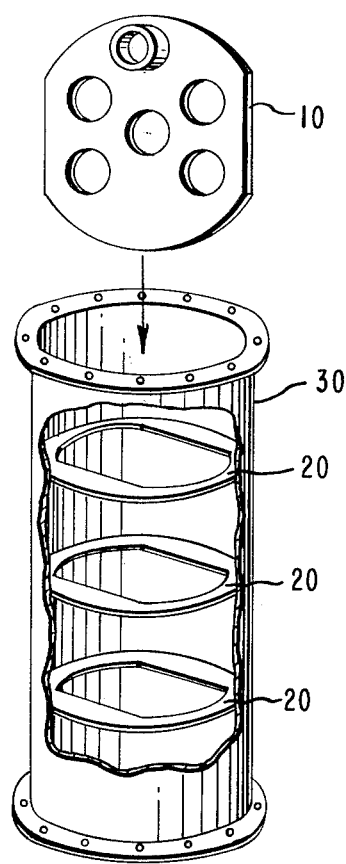

FIG. 2 is the top view of a tray support ring 20 having a circular periphery 22 and an opening 24 in the shape of two circular portions 26 interrupted by two parallel chords 28.

Figure 4:
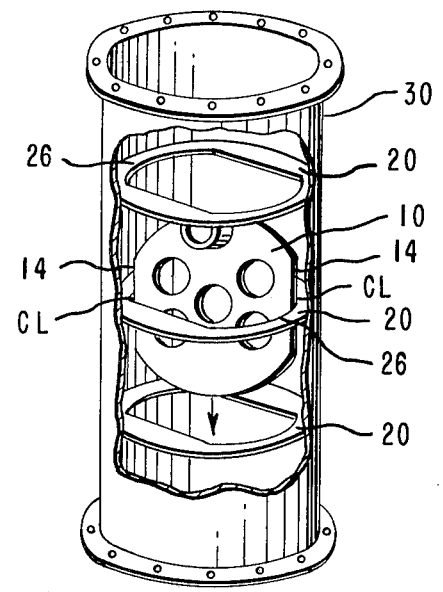
Figure 5:
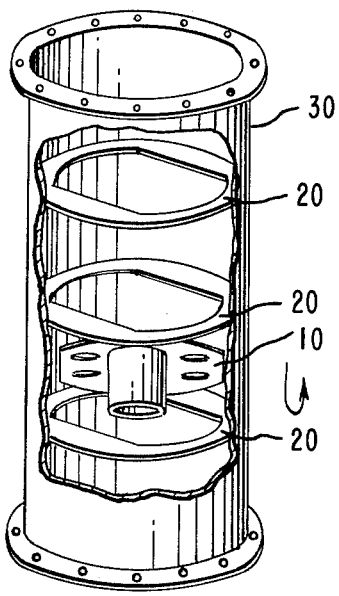
Figure 6:
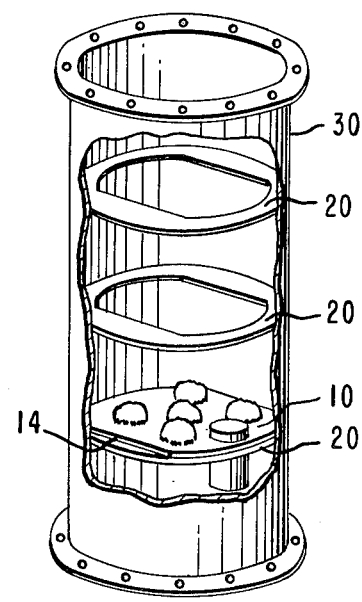

FIGS. 3 through 6 illustrate in sequence how a tray may be passed through support rings mounted in a cylindrical distillation column spool piece and positioned for assembly at the desired location. The arrows indicate the direction of movement of vertically oriented tray 10 through spool piece 30. As shown in FIG. 4, tray 10 is dimensioned so that the tray width between tray chords 14 is smaller than the circular diameter of the opening in ring 20. When the desired tray location is reached, as shown in FIGS. 5 and 6, tray 10 is tilted to a horizontal position, turned and set on ring 20 so that the chords 14, or flat sides, of the tray are in a substantially parallel relationship with those of the corresponding support ring so that a liquid-tight joint can be made.

The new tray design permits the use of one piece trays in spool pieces which contain more than two plates. The trays are circular except that on two sides, at 180° to each other, the circular form has been reduced to form flat edges (chords). The length of each chord can be about 0.4 times the outer diameter of the circular part of the tray.

The length of the tray chord is a function of the tray circular diameter (OD), the clearance desired beween the tray chords and the circular inside ring diameter (CL), and the overlap required to seal the tray to the support ring (OL). As an example, a tray with a circular diameter of 22 30/32 in. (58.26 cm), a tray-to-ring overlap of 1 /32 in. (2.62 cm.), and a tray-to-ring assembly clearance of 4/32 in. (0.32 cm.), would require a ring diameter (ID) of 20 28/32 in. (53.02 cm.). The distance from tray center to tray chord would be 10 10/32 in. (26.19 cm.). A general expression can be derived. Tray center to tray chord = CF = ½(OD)−OL−CL. Length of the tray chord = TF = $2\sqrt{(OD)^2/4 - (CF)^2} = \sqrt{(OD)^2 - 4(CF)^2}$. This can be rewritten as: TF = $\sqrt{(OD)^2 - 4[(OD/2 - OL - CL)]^2} = \sqrt{(OD)^2 - [OD - 2(OL + CL)]^2}$.

This tray and tray support permits the use of one piece trays in spool pieces containing more than two plates per piece. The new trays are less complex, have fewer parts, and make assembly and disassembly of distillation column easier.

What is claimed is:

1. In a distillation column having a cylindrical wall and containing more than two distillation plates, each plate being comprised of a circular tray peripherally supported by a ring attached to said inner cylindrical wall of the column, and the support ring having an opening, the improvement comprising said tray periphery and said opening both having the shape of a circle interrupted by two parallel chords, the tray width between the tray chords being smaller than the circular diameter of the support ring opening.

2. The apparatus of claim 1 wherein the lengths of the tray chords are equal and the lengths of the ring opening chords are equal.

3. The apparatus of claim 2 wherein the tray chord length is about 0.4 times the circular diameter of the tray.

* * * * *